July 23, 1929.  C. K. BALDWIN ET AL  1,721,802
VIBRATORY SCREEN
Filed July 29, 1926   5 Sheets-Sheet 2

Inventor,
Clarence Kemble Baldwin and
Samuel Davis Robins,
Lousey Hole
Attorneys.

July 23, 1929.  C. K. BALDWIN ET AL  1,721,802
VIBRATORY SCREEN
Filed July 29, 1926  5 Sheets-Sheet 4

Patented July 23, 1929.

1,721,802

UNITED STATES PATENT OFFICE.

CLARENCE KEMBLE BALDWIN, OF SCARSDALE, AND SAMUEL DAVIS ROBINS, OF WOOD-MERE, NEW YORK, ASSIGNORS TO ROBINS CONVEYING BELT CO., OF NEW YORK, N. Y., A CORPORATION OF NEW JERSEY.

VIBRATORY SCREEN.

Application filed July 29, 1926. Serial No. 125,718.

This invention relates to improvements in vibratory screens, of the type used in sifting ore, crushed rock, sand, gravel, etc., and more particularly to a screen of the unbalanced pulley type, in which each point on the screening surface moves in a circular orbit in a vertical plane.

One of the general objects of the invention is to provide a structure in which the same degree of vibration is imparted to the screening surface throughout the entire area of the latter, and in which the amplitude of vibration may be readily and accurately adjusted to meet the demands of various conditions under which the screen is used. In effecting the uniform, controlled adjustable vibration of the entire screen, we utilize a power-driven shaft, which is operatively connected with the screen, and employ a plurality of mass units mounted on the shaft for rotation therewith, such units each having a center of mass eccentric to the spin axis of the shaft, and these units have their centers of mass annularly or rotatably adjustable about the shaft in respect to each other for varying the radial distance of the principal axis of inertia of the revolving assembly from the spin axis of the shaft to thereby control the centrifugal vibratory effort.

The centers of mass of the units are axially so disposed on the shaft that throughout the range of their adjustment, the principal axis of inertia of the revolving assembly of such units is substantially parallel to the spin axis of the shaft. The construction which we have provided avoids the occurrence of dead zones or areas in the screen, due to a dead center in the shaft which operates the screen, or in an extension thereof, an objection common to many screens of the unbalanced pulley type known to us and one which our invention overcomes, and results in a vibration of even amplitude throughout our screen, and consequently the utilization of the entire screen area, without the occurrence of dead areas, or areas of different amplitude of vibration from other areas of the screen.

Another general object of the invention is to greatly simplify and lighten the construction of screens of high frequency of vibration, and to provide a screen composed of a relatively small number of parts, with the result that the screen may be constructed at a greatly reduced cost over many screens of similar capacity and which are productive of inferior results. This general object of the invention is attained in part, by novel construction wherein the screen is carried in a live frame on which the vibrating mechanism is supported, and resilient means which cushions the screen is interposed between the live frame, and a fixed base frame, such resilient means, in addition to cushioning and absorbing the vibrations in the screen, serving the function of maintaining tension on the screening member, and of supporting the entire weight of the vibrating screening mechanism, and of the load thereon.

A further general object of the invention is to provide a screening mechanism in which the screen cloth may be utilized in the condition in which it comes from the weaving machines, without the addition of costly edge bindings or folding treatments commonly necessary, and one in which a worn screen may be easily and quickly removed and a new one inserted in its place.

These, and other objects of a more or less subsidiary nature, will become more apparent as the description proceeds.

In the drawings, which are illustrative of one example of our invention, and in which like characters of reference indicate like parts throughout the several figures,—

Referring more particularly to the drawings, the screen includes in general, the vibrator mechanism A, the live frame on which the vibrator mechanism and the screen are mounted, indicated generally at B, the screen C, the base frame D, and the cushioning springs E. The base frame is rigidly mounted on a suitable support, and does not move, whereas the vibrator mechanism, live frame and screen all vibrate. The spring mechanism indicated generally at E, to be hereinafter more fully described, maintains tension on the screen C, retaining it stretched to the desired extent, cushions the live frame and screen and vibrator mechanism, absorbing vibrations thereof, so that none of such vibrations are transmitted to the base frame, and in addition, through the compression of the spring mechanism, supports the live frame, screen, vibrator mechanism and the load.

The vibrator mechanism.

Figure 1:
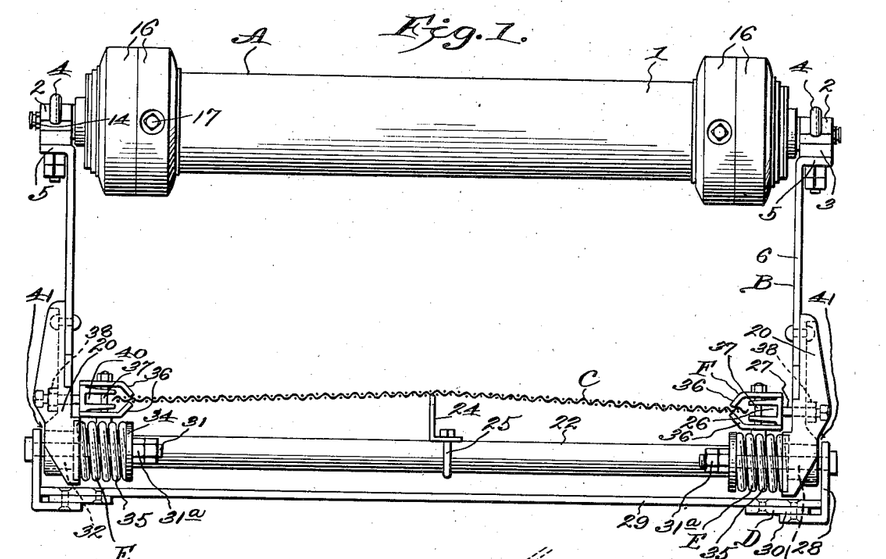
Figure 1 represents an elevational view of a screen constructed according to our invention, looking at one end thereof.
Figure 2:
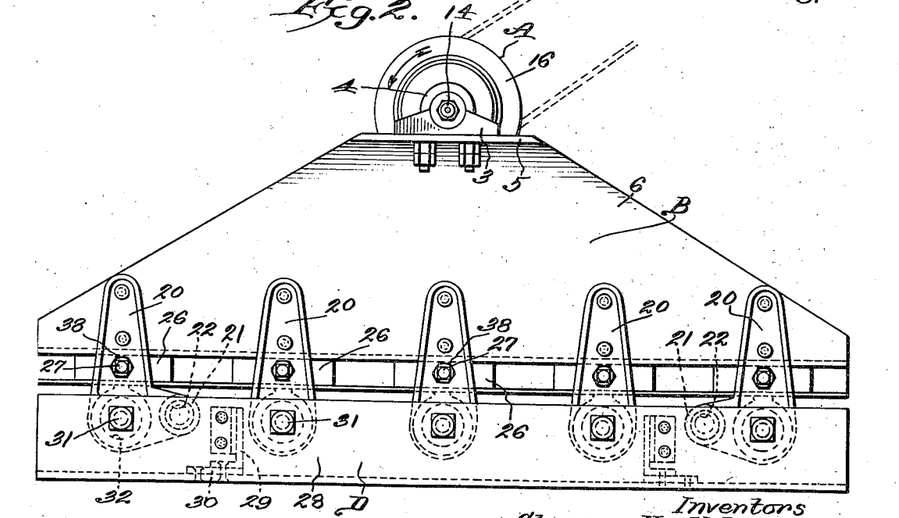
Figure 2 represents a side elevational view.
Figure 3:
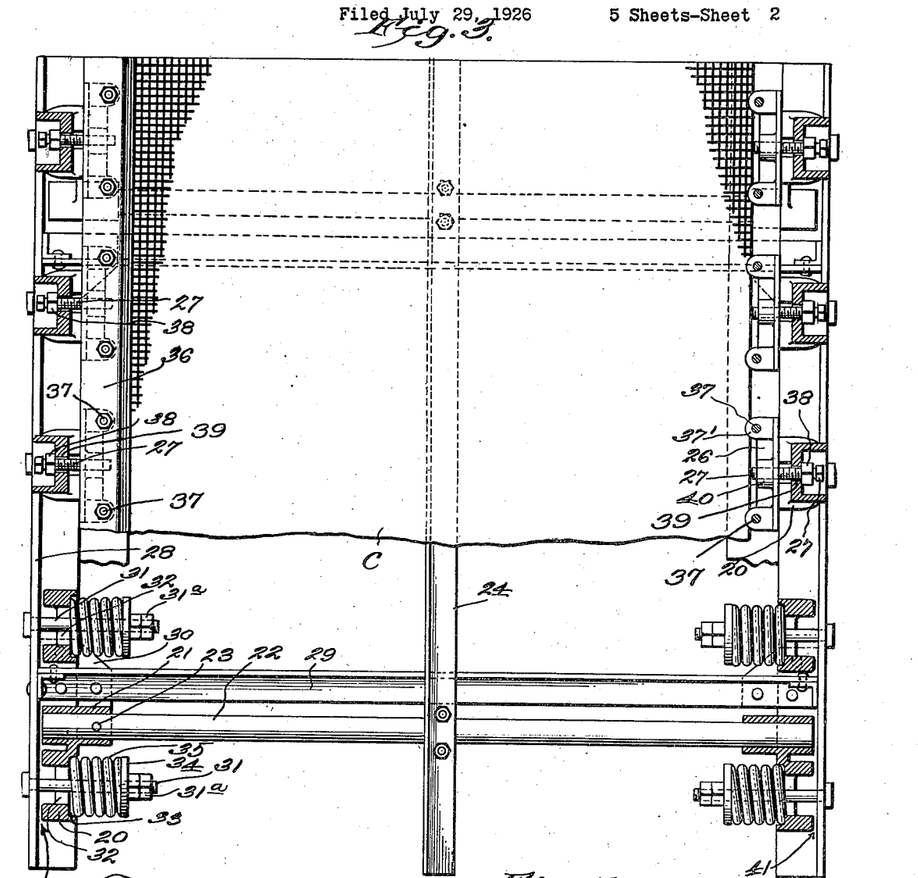
Figure 3 represents a plan view partly broken away and partly in section, the upper member of the wire clamp jaw on the right hand side being removed.
Figures 4, 5:
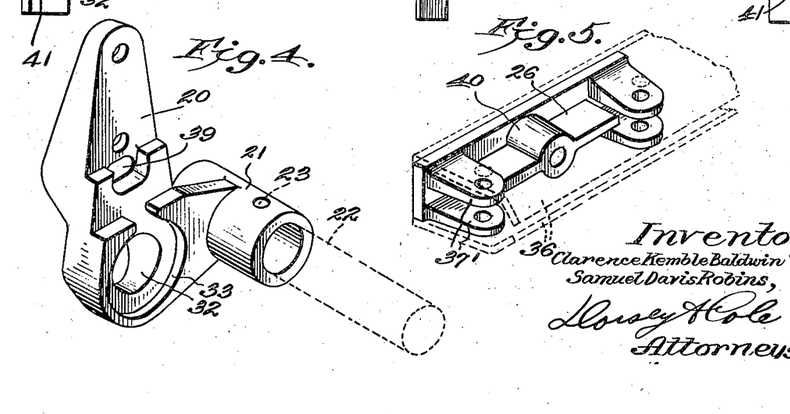
Figure 4 represents a view in perspective of one of the end spring receivers.
Figure 5 represents a view in perspective of one of the pulling blocks, showing in dotted lines its relationship to the upper and lower members of the wire cloth clamp.
Figures 6, 7, 8, 9, 10:
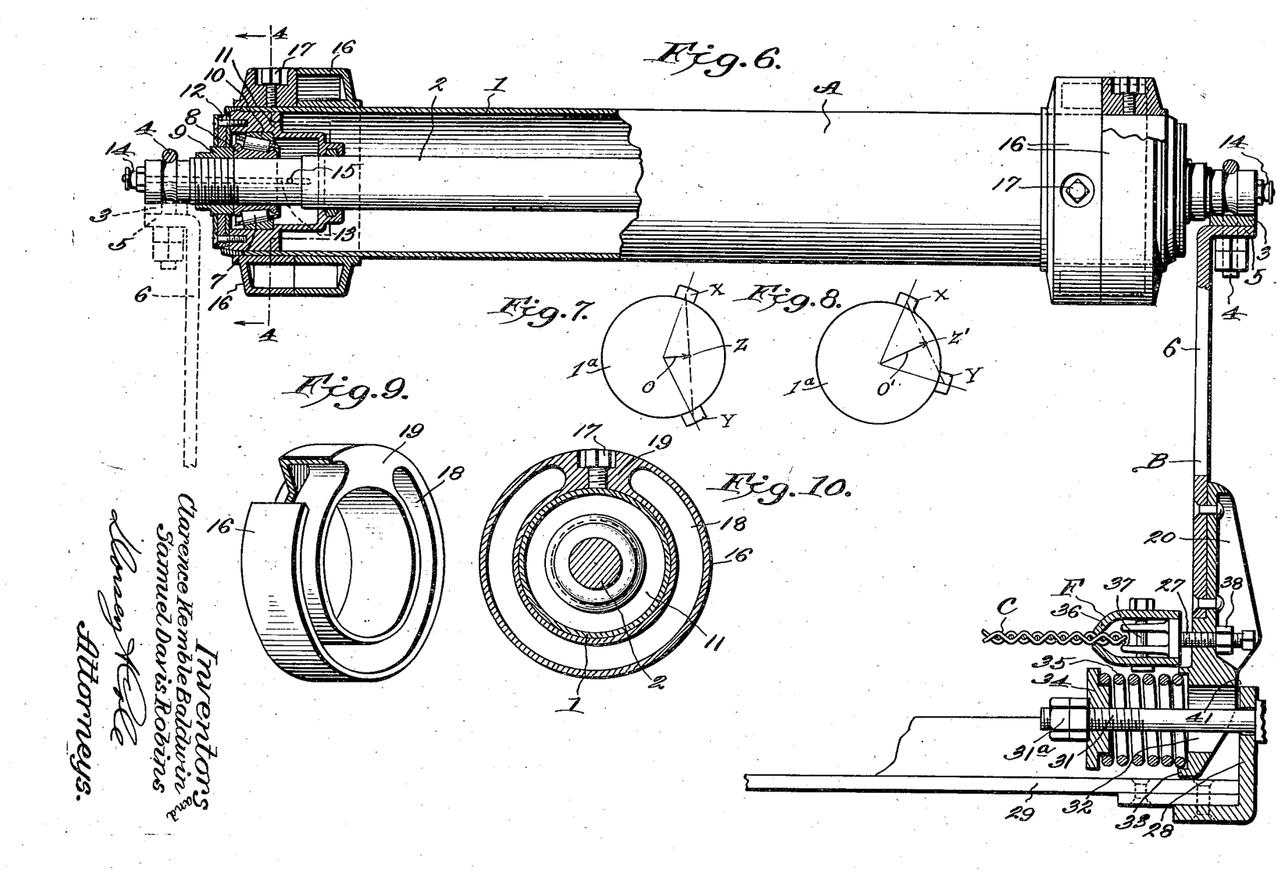
Figure 6 represents an enlarged view, partly in section and partly broken away, showing details of the vibrator element, portions of the screening mechanism being shown in section.
Figures 7 and 8 are diagrammatic figures explanatory of the effect of the adjustable unbalanced collars.
Figure 9 represents a view in perspective, partly broken away, of one of the collars removed.
Figure 10 represents a sectional view on the line 4—4 of Figure 6.
Figures 11, 12:
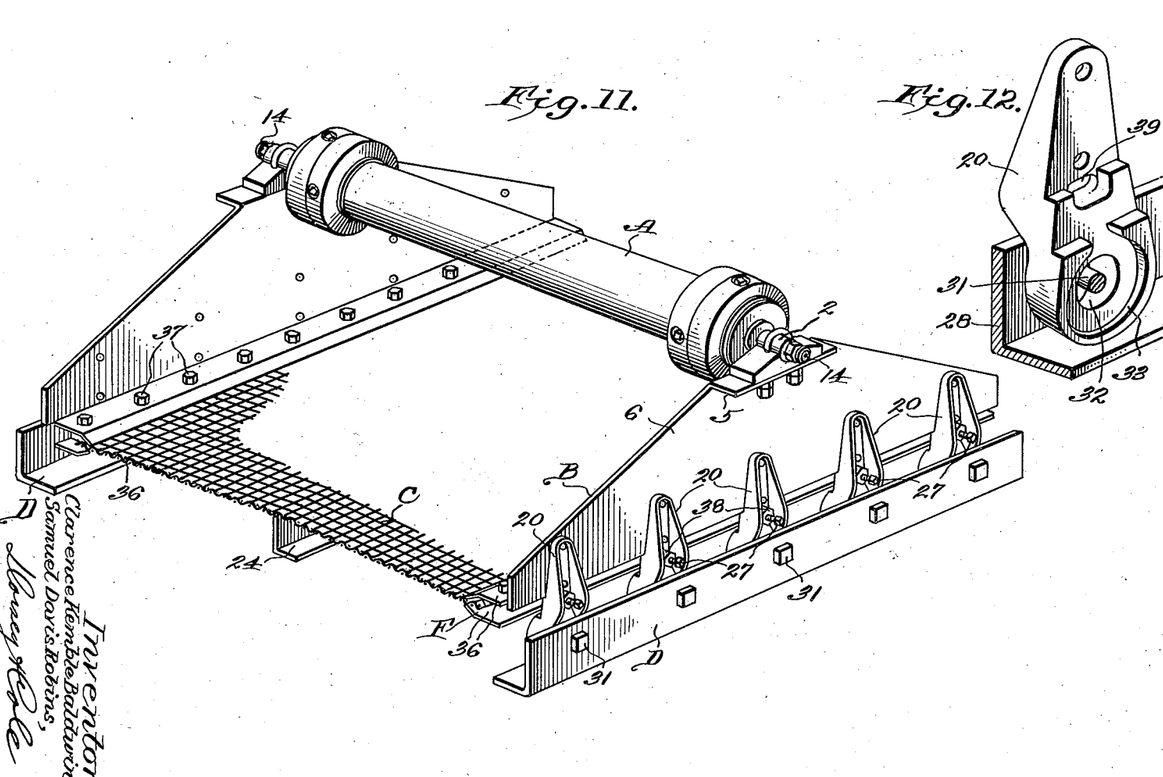
Figure 11 represents a view in perspective of the screen.
Figure 12 represents a view in perspective of one of the intermediate spring receivers.
Figure 13:
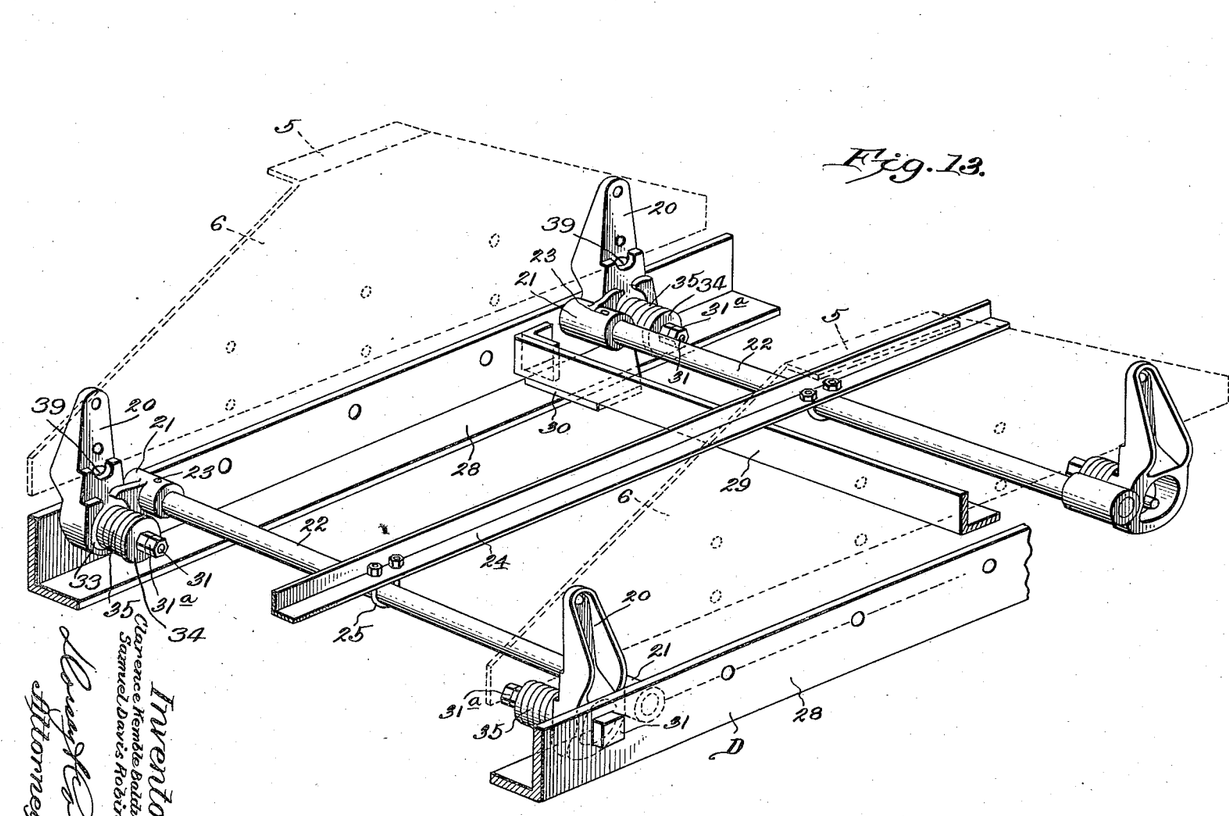
Figure 13 represents a perspective view, with the vibratory mechanism, screen assembly, and intermediate spring receivers removed.

Referring more particularly to Figure 6, the vibrator mechanism includes a live shaft 1 (shown in the form of a drum) which is driven from a suitable source of power, a belt being illustrated in dotted lines, in Fig. 2. The live shaft rotates about a fixed or dead shaft 2, the ends of which rest upon filler blocks 3, through which pass U bolts 4, such bolts engaging grooves in the ends of the shaft, and serving to secure the shaft and the filler blocks to the over-turned upper edges 5 of the side plates 6 of the live frame. Thus the dead shaft is secured to the live frame in which the screen C is supported, and the live shaft or drum rotates about the fixed or dead shaft 2.

Bearings 7, of suitable design, such as roller bearings, are interposed between the live shaft 1 and the fixed shaft 2, such bearings engaging an inner race-way 8 mounted on the fixed shaft (and adjustable through a screw-adjusting collar 9) and an outer race-way 10 carried in the bearing receiver 11 mounted within the ends of the live shaft 1. Grease seals 12 surrounding the adjusting collars 9 and carried by the bearing receivers 11, prevent the escape of lubricant, and also prevent the ingress of dust, such lubricant being introducable by means of a grease gun, through the grease channel 13 provided in the shaft 2. The channel terminates at its outer end at the nipple 14, and at its inner end communicates with the interior of the bearing receiver at the branch duct 15.

The mass units, for imparting the vibratory movements to the screen, take the form of collars 16, a pair of which are mounted at each end of the vibratory shaft 1. These collars or mass units, which rotate with the vibratory shaft, are capable of being adjusted annularly there-around, and are secured in adjusted position through the means of set screws 17. The collars are hollow as at 18, save for the eccentrically weighted portions 19 thereof, through which portions the set screws preferably extend, and the inner open faces of the collars of each pair are placed face to face as indicated in Figure 6, the outside faces of the collars being continuous as shown.

In mounting the collars or mass units on the vibratory shaft, the collars are so adjusted that the center of mass of one collar of each pair, is in a line with the center of mass of one of the collars of the other pair, such line being parallel to the axis of the shaft, and the other of each pair of collars or mass units is then revolubly or annularly adjusted about the shaft and in respect to the companion collar to so vary the radial distance of the principal axis of inertia of the combined assembly of mass units or collars from the spin axis of the shaft, as to give the desired centrifugal vibratory effort to the shaft when it is rotated. By changing the angular relation of the mass units, with respect to each other about the axis of the shaft, the centrifugal force which is brought into play in effecting the vibrations of the screen is controllable, and may be increased or decreased throughout a wide range. It should be borne in mind, however, that one of the desideratums of an efficient screen, is that the screening effect will be maintained throughout the entire area of the screen, and that no dead zones or dead areas in the screening surface occur. In order to accomplish this, the mass units or collars are so adjusted and the centers of mass of the units as a whole are so disposed, throughout the range of adjustment, that the principal axis of inertia of the revolving mass unit assembly is substantially parallel to the spin axis of the shaft, to thereby avoid the occurrence of a dead center in the shaft or in an extension thereof about which the shaft would otherwise tend to oscillate.

In order to illustrate the method whereby the centrifugal force which acts upon the mechanism for imparting the vibrations may be varied, to thus vary the amplitude of the vibrations, reference is made to Figures 7 and 8. In these figures, 1ª indicates a revoluble cylinder or shaft, weights X—Y being adjustably mounted on the surface thereof. Considering the position of the weights in Figure 7, the center of gravity, or the mass center of the two weights will be at the point Z, and at a distance O from the spin axis of the cylinder, since the center of gravity of two equal masses spaced apart, lies on a line through their individual centers of gravity, and midway between them. If now, the weights be so adjusted as to bring them to the position indicated in Figure 8, it will be seen that their angular relation with respect to each other about the axis of the cylinder has been decreased, and their combined center of gravity, or mass center, will have moved outwardly to Z', a distance O' from the spin axis of the cylinder considerably greater than the distance O, and the centrifugal effort acting upon the cylinder will be greater, since, assuming the speed of rotation of the cylinder to be constant, and the mass of the combined weights to be constant, the centrifugal force will vary directly as the distance of the center of mass from the spin axis of the cylinder.

It is thus apparent that by angularly adjusting the collars with respect to each other about the vibratory shaft, the amplitude of the vibrations imparted to the screen may be increased or decreased throughout a wide range, and by keeping the principal axis of inertia of the mass, unit assembly parallel to the spin axis of the shaft, uniform vibration throughout the entire screen area will be maintained.

*The live frame assembly.*

The live frame, to which the screen is connected, and upon which the vibratory mechanism is mounted as above described, consists, in addition to the fixed shaft 2, of the triangular side plates 6, to the lower portions of which are secured the spring receivers 20. A series of these receivers is secured to each of the side plates, and the end receivers of each series are provided with sleeves 21, in which the carrier pipes 22 are mounted. On one side of the frame, these pipes are fixed in the sleeves by bolts 23, while at the other side of the frame, the pipes are free to slide within the sleeves. Thus the sides of the frame may move toward or away from each other during the adjustment of the screen, to be hereinafter more fully referred to. The carrier pipes 22 support the angle bar 24 which is mounted on the pipes through the medium of the U-bolts 25, and such bar extends longitudinally down the center of the screen C, raising or bucking up the central portion thereof somewhat above the edge portions to prevent whip from occuring in the screen.

It will therefore be seen that the angle bar in engaging the screening surface acts to suppress independent vibrations thereof so that the said surface will move with the live frame as a unit. It will be understood, of course, that the means of suppressing independent vibrations in the screen is not limited to the single angle bar 24 illustrated.

The screen cloth through the medium of the grips F, and the pulling blocks 26 and tension screws 27, which latter pass through the spring receivers 20, is supported between the spring receivers as will appear more in detail hereinafter.

*The base frame and spring assembly.*

The base frame, which is fixedly mounted to any suitable support, (usually in an inclined position) includes the side angles 28, between which extend the compression cross members 29. Gusset plates 30 are interposed between and riveted to the side angles and the cross members. The base frame is thus of rigid construction. The side angles of the base frame carry a series of spring bolts 31, corresponding in number to the spring receivers 20, and these bolts extend through openings 32 in the lower ends of the spring receivers, such openings being of much greater diameter than the diameter of the bolts, to provide clearance sufficient to allow vibration of the screening mechanism without engagement of the spring receivers with the bolts. The spring receivers are arranged on the inside of the side angles 28. Seated in sockets 33 in the spring receivers, and interposed between such receivers and the washers 34, carried by the bolts 31, are coil springs 35, which surround the bolts. The washers bear against nuts 31ª threaded on the bolts.

These springs are placed under high compression by taking up on the nuts 38, carried by the tension screws 27, which nuts bear against the spring receivers. The adjustment of the nuts draws the pulling blocks, thus stretching the wire cloth to the desired degree, and placing the springs under high compression, such that the weight of the live frame, vibrator mechanism, screen and load, are entirely supported by the springs. It will be understood that the base frame and the bolts 31 are at all times stationary, the movement imparted to the outer ends of the springs by the vibration set up in the screening mechanism being gradually taken up by the springs and diminishing until at their inner ends where they engage against the washers, no movement takes place. Thus the springs, in addition to cushioning and absorbing the vibrations of the screening mechanism, maintain the cloth in stretched condition, and support the weight of the parts and the load as above pointed out.

*The screen assembly.*

The screen assembly includes the screen C itself, the cloth grips F, which are in the form of jaws 36 above and below the screen and extending the length thereof, the pulling blocks 26 through the ears 37' of which the bolts 37 extend for connecting the jaws 36 to the pulling blocks and for drawing these jaws together to clamp the cloth, and the tension screws 27 and adjusting nuts 38. It will be understood that the pulling blocks correspond in number to the spring receivers 20, the tension screws 27 being passed through openings 39 in the spring receivers and threaded into sockets 40 cast integral with the pulling blocks 26. As heretofore pointed out, by turning the nuts 38 carried on the tension screws, and which bear against the spring receivers, the pulling blocks may be drawn outwardly to stretch the wire cloth to the desired tension and to compress the tension springs 35, and a predetermined clearance (such as a quarter of an inch), between the spring receivers and the side angles of the base frame as at 41, indicates when the desired tension on the cloth has been attained. Thus in order to adjust the screening surface and maintain a correct tension thereon from time to time, as may become necessary, all the workman needs do is to take up the nuts 38 along one side of the screen mechanism until the predetermined clearance is obtained, the springs being designed with such weight and proportions as to automatically give the screen the desired tension when the adjustment is made as described.

It is to be noted that in assembling the mechanism, the screen, with the clamps thereon, and with such clamps connected to the pulling blocks, form a unit which is placed between the sides of the live frame, whereupon the tension screws are passed through the spring receiver, threaded into the sockets of the pulling blocks, and the nuts 38 thereafter tightened to the desired degree. Thus it is a simple matter to take out the screen assembly and replace the screen with a new one when that becomes necessary.

The jaws 36 of the clamp, extending throughout the length of the screen, engage in valleys formed in the woven surface of the screen, and when drawn together by the bolts 37, clamp the screen between them. From this construction it will be noted that the screen cloth itself is directly engaged by the clamps, and that no special treatment of the edges of the cloth so common in the art, is necessary, and hence the cloth can be used in the condition in which it comes from the weaving machines, without necessitating the further costly operations oft times made upon it before it can be used in many types of screening machines. Furthermore, it will be noted that this construction provides an even tension upon each of the cross strands of the cloth, so that the cloth as a whole, is evenly tensioned throughout its entire area.

The foregoing detailed description has been given for purposes of clearness of understanding only, and no undue limitations should be deduced therefrom, but the appended claims should be construed as broadly as permissible, in view of the prior art.

Having thus described our invention what we claim is:—

1. In a vibratory screen, a live frame including a screening surface, and means for imparting vibration to the live frame and screening surface comprising a revoluble shaft operatively connected with the live frame, a plurality of mass units mounted on the shaft for rotation therewith, each unit having its center of mass eccentric to the spin axis of the shaft, said units having their centers of mass annularly adjustable in respect to each other for varying the radial distance of the principal axis of inertia of the revoluble assembly from the spin axis of the shaft to thereby control the centrifugal vibratory effort, the centers of mass of the units being axially so disposed on the shaft that throughout the range of adjustment, the principal axis of inertia of the revoluble assembly is substantially parallel to the spin axis of the shaft.

2. In a vibratory screen, a screening surface, and means for vibrating such surface, comprising a rotary element operatively connected with the screening surface, a series of mass units mounted on the rotary element for rotation therewith and having their centers of mass eccentric to the spin axis thereof, said units having their centers of mass adjustable about the spin axis in respect to each other for varying the radial distance of the principal axis of inertia of the rotary assembly from the spin axis thereof, the centers of mass of such units being so disposed that the principal axis of inertia is substantially parallel to such spin axis.

3. In a vibratory screen, the combination of a base frame, a live frame, including a screening member, means for supporting and maintaining tension on the screening member comprising resilient means interposed between the base frame and the live frame, a vibratory shaft operatively connected with the live frame, a series of mass units mounted on the vibratory shaft for rotation therewith and having their centers of mass eccentric to the spin axis of the vibratory shaft, and annularly adjustable about such spin axis in respect to each other, the centers of mass of such units being disposed along a principal axis of inertia substantially parallel to said spin axis.

4. In a vibratory screen, the combination of a base frame, a live frame, a screening member mounted on the live frame, means for supporting and maintaining tension on the screening member comprising resilient means interposed between the base frame and the live frame, means for imparting vibration to the live frame and screen including a rotary element, and means mounted on the rotary element for imparting a centrifugal effort thereto, such means having a principal axis of inertia substantially parallel to and radially adjustable with respect to the spin axis of such rotary element.

5. In a screening apparatus, the combination of a live frame, including side plates, a screening surface stretched therebetween, a rotary element extending substantially the width of the screening surface and operatively connected to the side plates, and pairs of unbalanced mass units mounted on the rotary element near the extremities of the latter and having their centers of mass eccentric to the spin axis of such rotary element and annularly adjustable thereabout, the centers of mass of such units being disposed along a principal axis of inertia substantially parallel to said spin axis, the mass units being adjustable with reference to each other to vary the distance of such axis of inertia from such spin axis.

6. In a screening apparatus, the combination of a fixed base frame, a live screen frame including side plates, spring receivers secured to the side plates, cloth grips, screening cloth stretched therebetween, means connected to the cloth grips for adjusting them with respect to said side plates, bolts carried by said base frame and extended through openings in said spring receivers, thrust washers carried by said bolts, and springs under high compression interposed between said thrust washers and said spring receivers, said springs supporting said live frame and simultaneously maintaining the tension in the screening cloth.

7. In a screening apparatus, the combination of a fixed base frame, a live screen frame, including side plates, cloth grips carried by the side plates, and engaging screening cloth interposed therebetween, spring receivers carried by said side plates, springs under high compression interposed between said spring receivers and the base frame and arranged substantially parallel with the screening cloth, said springs solely supporting the screening frame and simultaneously maintaining the screening cloth under high tension.

8. In a screening apparatus, the combination of a base frame, a live frame including side plates, a screening surface interposed between the side plates, means adjustable with respect to the side plates connecting the screening surface adjacent opposite edges to said side plates, and resilient means interposed between the base frame and the live frame and serving the double function of supporting the live frame and maintaining the screening surface taut.

9. In a screening apparatus, the combination of a base frame, a live frame, a screening surface carried by the live frame, means interposed between the base frame and the live frame, said means solely and resiliently supporting the live frame and simultaneously maintaining the screening surface taut, and vibratory means directly connected to and adapted to vibrate the live frame.

10. In a screening apparatus, the combination of a base frame, a live frame having a screening surface, springs under high compression arranged substantially parallel to the screening surface interposed between the base frame and the live frame, said springs solely supporting the live frame and simultaneously maintaining the screening surface taut, and means for vibrating the live frame.

11. In a vibratory screen, the combination of a stationary base frame, a live frame, including a screening surface, a plurality of coil springs disposed along opposite edges of said screening surface between the live frame and the stationary frame, said springs having their axes parallel to one another and to the screening surface and exerting their axial thrust to tension the screening surface and simultaneously to offer resilient support thereto, and means to actuate the live frame with a vibratory movement.

12. In a vibratory screen, a screening surface, opposed coil springs through whose axial deflection the screening surface is held taut, the coil axes of said springs being substantially parallel to one another and to the screening surface, said springs being attached to opposite edges of the screening surface and exerting forces equal and opposite, thereby to tension the screening surface and simultaneously to offer a yieldable support to said screening surface, means to actuate the screening surface with a vibratory movement substantially at right angles to the coil axes of the springs, and means for suppressing independent vibration of the screening surface.

13. In a vibratory screen, the combination of a base frame, a live frame including a screening surface, and a vibrator attached thereto along the opposite edges of the screening surface, a plurality of coil springs disposed along said opposite edges of the screening surface, their coil axes being parallel to one another and to the screening surface, said springs outwardly exerting their axial thrust to tension the screening surface and having sufficient space remaining between coils when under compression to permit of sidewise deflection substantially at right angles to their coil axes, thereby to offer resilient support to the live frame.

14. In a vibratory screen, the combination of a base frame, a live frame including a screening surface, and a vibrator attached thereto along opposite edges of the screening surface, and rows of coil springs oppositely placed along the edges of the screening surface to which the vibrator is attached, said coil springs maintaining the screening surface taut and simultaneously offering a resilient support to the live frame.

15. In a vibratory screen, a screening surface, opposed coil springs through whose deflection the screening surface is held taut in its frame, the coil axes of said springs being substantially parallel to one another and to the screening surface, said springs being connected to opposite edges of the screening surface and exerting equal and oppositely outward forces, thereby to tension the screening surface and simultaneously support said screening surface, means to actuate the screening surface with a vibratory motion, and means for suppressing independent vibration of the screening surface.

16. In a vibratory screen, a screening surface, rows of coil springs disposed along opposite edges of such surface and holding said surface taut, the coil axes of said springs being parallel to one another and to the screening surface, and exerting their axial thrust to tension the screening surface, said springs having sufficient space remaining between coils when under compression, to permit of deflection away from the coil axes, thereby to offer resilient support to the screening surface, and a bar extending longitudinally of the screening surface between opposite edges thereof and exerting an upward pressure thereon to prevent whipping of the screening surface.

17. In a vibratory screen, the combination of a base frame, a live frame, a screening member, resilient means interposed between the base frame and the live frame and serving the double function of supporting the live frame and maintaining the screening member taut, means for setting up vibrations in the live frame and the screening member, and means for suppressing vibrations in the screening member independent of vibrations in the live frame whereby the live frame and screening member vibrate as a unit.

In testimony whereof we hereunto affix our signatures.

CLARENCE KEMBLE BALDWIN.
SAMUEL DAVIS ROBINS.